US009098066B2

(12) United States Patent
Yoon et al.

(10) Patent No.: US 9,098,066 B2
(45) Date of Patent: Aug. 4, 2015

(54) DUAL HOLOGRAPHY 3D DISPLAY DEVICE

(71) Applicant: LG DISPLAY CO., LTD., Seoul (KR)

(72) Inventors: Minsung Yoon, Gyeonggi-do (KR); Sunwoo Kim, Gyeonggi-do (KR); Minyoung Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 332 days.

(21) Appl. No.: 13/677,491

(22) Filed: Nov. 15, 2012

(65) Prior Publication Data

US 2013/0120525 A1    May 16, 2013

(30) Foreign Application Priority Data

Nov. 15, 2011    (KR) .................. 10-2011-0119187

(51) Int. Cl.
  *H04N 15/00*    (2006.01)
  *G03H 1/26*    (2006.01)
  *G03H 1/22*    (2006.01)

(52) U.S. Cl.
  CPC .............. *G03H 1/268* (2013.01); *G03H 1/2294* (2013.01); *G03H 1/2205* (2013.01); *G03H 2001/221* (2013.01); *G03H 2222/18* (2013.01); *G03H 2222/34* (2013.01); *G03H 2223/16* (2013.01); *G03H 2226/05* (2013.01)

(58) Field of Classification Search
  USPC ........... 348/40, 41, 42, 43, 44, 51, 54, 55, 78; 345/102, 419, 581; 349/11, 15, 25, 30; 359/15, 354, 721
  See application file for complete search history.

(56) References Cited

U.S. PATENT DOCUMENTS

| | | | |
|---|---|---|---|
| 2002/0021492 A1* | 2/2002 | Morishima et al. ........... | 359/463 |
| 2002/0118452 A1* | 8/2002 | Taniguchi et al. ............. | 359/463 |
| 2004/0027626 A1* | 2/2004 | Yamauchi et al. ............. | 359/3 |
| 2004/0179094 A1* | 9/2004 | Lo ................................... | 348/42 |
| 2008/0007511 A1* | 1/2008 | Tsuboi et al. .................. | 345/102 |
| 2009/0046214 A1* | 2/2009 | Park et al. ....................... | 349/15 |
| 2009/0219385 A1 | 9/2009 | Leister et al. | |
| 2010/0118360 A1* | 5/2010 | Leister ............................. | 359/9 |
| 2010/0220175 A1* | 9/2010 | Claydon et al. ................. | 348/43 |
| 2010/0302349 A1* | 12/2010 | Huang et al. .................... | 348/51 |
| 2011/0025821 A1* | 2/2011 | Curtis et al. .................... | 348/43 |
| 2011/0109880 A1* | 5/2011 | Nummela ....................... | 351/210 |
| 2011/0157335 A1* | 6/2011 | Yoo et al. ........................ | 348/56 |
| 2011/0234777 A1* | 9/2011 | Kobayashi et al. ............. | 348/56 |

FOREIGN PATENT DOCUMENTS

CN    101347003 A    1/2009

OTHER PUBLICATIONS

Chinese Office Action dated Jun. 24, 2014 for corresponding Chinese Patent application No. 201210454328.1.

* cited by examiner

*Primary Examiner* — Jefferey Harold
*Assistant Examiner* — Mustafizur Rahman
(74) *Attorney, Agent, or Firm* — Morgan, Lewis & Bockius LLP (57) ABSTRACT

The present disclosure relates to a dual holography three dimensional display device. The present disclosure suggests thin flat type holography 3D display device comprises: a left-eye display panel for representing a left-eye 3D image; and a right-eye display panel disposed at one side of the left-eye display panel for representing a right-eye 3D image. By combining the left-eye holography display panel with the right-eye holography display panel, it is possible to suggest high quality and high speed processed holography 3D images/video without expensive high speed processing display panel.

13 Claims, 6 Drawing Sheets

FIG. 1

Related Art

DUAL HOLOGRAPHY 3D DISPLAY DEVICE

This application claims the benefit of Korea Patent Application No. 10-2011-0119187 filed on Nov. 15, 2011, which is incorporated herein by reference for all purposes as if fully set forth herein.

BACKGROUND OF THE INVENTION

1. Field of the Invention

The present disclosure relates to a dual holography three dimensional display device. Especially, the present disclosure relates to a non-glasses type 3D display device in which the holography 3D images are divided into the left-eye 3D images and the right-eye 3D images for representing the real 3D images.

2. Discussion of the Related Art

Recently, many technologies and researches for making and reproducing the 3D (Three Dimensional) image/video are actively developed. As the media relating to the 3D image/video is a new concept media for virtual reality, it can improve the visual information better, and it will lead the next generation display devices. The conventional 2D image system merely suggests the image and video data projected to plan view, but the 3D image system can provide the full real image data to the viewer. So, the 3D image/video technologies are the True North image/video technologies.

Typically there are three methods for reproducing 3D image/video; the stereoscopy method, the holography method and the integral imaging method. Among them, the holography method uses laser beam so that it is possible to observe the 3D image/video with naked eyes. The holography method is the most ideal method because it has an excellent visual autostereoscopic property without any fatigue of observer.

To produce a recording of the phase of the light wave at each point in an image, holography uses a reference beam which is combined with the light from the scene or object (the object beam). If these two beams are coherent, optical interference between the reference beam and the object beam, due to the superposition of the light waves, produces a series of intensity fringes that can be recorded on standard photographic film. These fringes form a type of diffraction grating on the film, which is called the hologram. The central goal of holography is that when the recorded grating is later illuminated by a substitute reference beam, the original object beam is reconstructed (or reproduced), producing a 3D image/video.

There was a new development of the computer generated holography (or CGH) that is the method of digitally generating holographic interference patterns. A holographic image can be generated e.g. by digitally computing a holographic interference pattern and printing it onto a mask or film for subsequent illumination by suitable coherent light source. the holographic image can be brought to life by a holographic 3D display, bypassing the need of having to fabricate a "hardcopy" of the holographic interference pattern each time.

Figure 1:
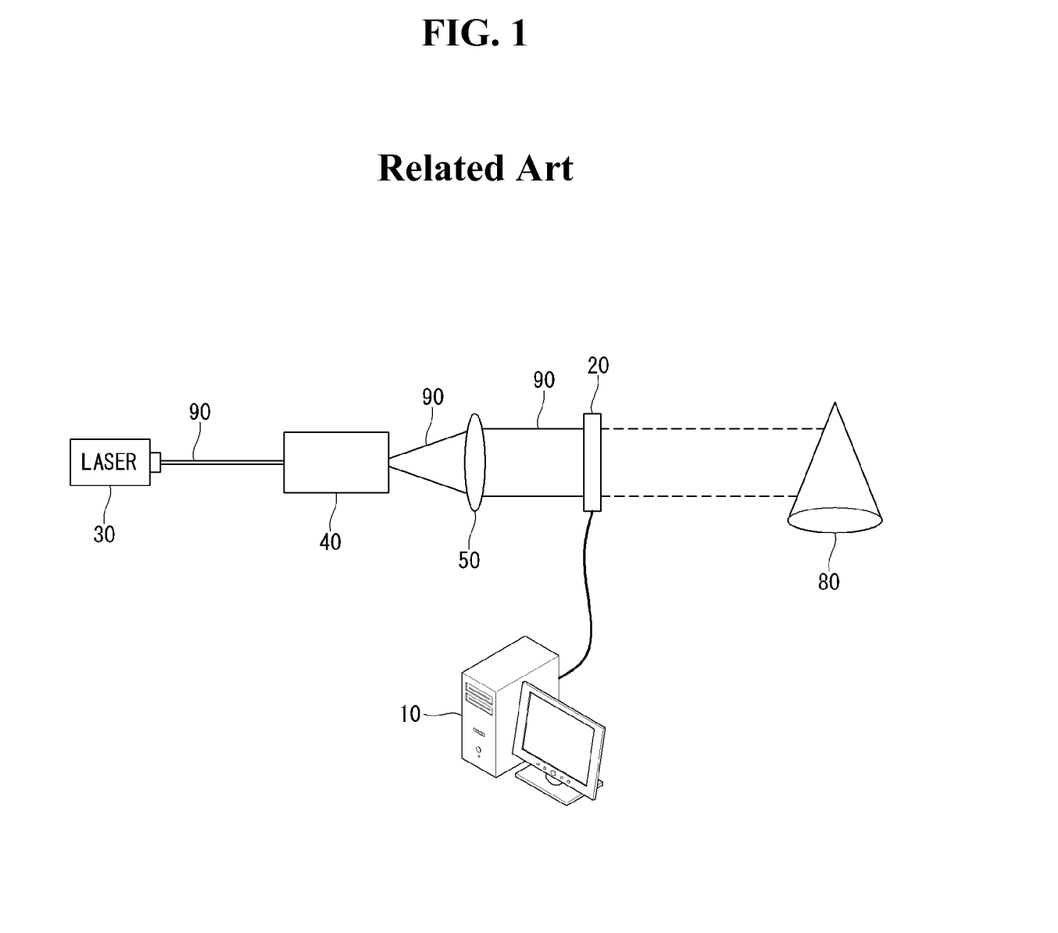
FIG. 1 is the structural drawing illustrating the digital holography image/video display device using the computer generated holography according to the related art.

Computer generated holograms have the advantage that the objects which one wants to show do not have to possess any physical reality at all. If holographic data of existing objects is generated optically, but digitally recorded and processed, and brought to display subsequently, this is termed CGH as well. For example, a holographic interference pattern is generated by a computer system and it is sent to a spatial light modulator such as LCSML (Liquid Crystal Spatial Light Modulator), then the 3D image/video corresponding to the holographic interference pattern is reconstructed/reproduced by radiating a reference beam to the spatial light modulator. FIG. 1 is the structural drawing illustrating the digital holography image/video display device using the computer generated holography according to the related art.

Referring to FIG. 1, the computer 10 generates a holographic interference pattern of an image/video data to be displayed. The generated holographic interference pattern is sent to a SLM 20. The SLM 20, as a transmittive liquid crystal display device, can represent the holographic interference pattern. At one side of the SLM 20, a laser source 30 for generating a reference beam is located. In order to radiate the reference beam 90 from the laser source 30 onto the whole surface of the SLM 20, an expander 40 and a lens system 50 can be disposed, sequentially. The reference beam 90 out from the laser source 30 is radiated to one side of the SLM 20 passing through the expander 40 and the lens system 50. As the SLM 20 is a transmittive liquid crystal display device, a 3D image/video corresponding to the holography interference pattern will be reconstructed/reproduced at the other side of the SLM 20.

The holography type 3D display system according to the FIG. 1 comprises a light source 30 for generating the reference light 90, an expander 40 and a lens system 50 which have relatively large volume. In case that this kind 3D display system is configured, it may have large volume and huge weight. That is, the conventional arts for the holography type 3D display system are not adequate to apply to the thin, light and portable display systems which are recently required. Therefore, it is required to develop a thin flat type holography 3D display system which can represent the real 3D images with the naked eyes.

SUMMARY OF THE INVENTION

In order to overcome the above mentioned drawbacks, the purpose of the present disclosure is to suggest a thin flat panel type holography 3D display device. The another purpose of the present disclosure is to suggest a thin flat panel type holography 3D display representing the high quality 3D images by providing holography 3D images to the left eye and the right eye of the observer, respectively. The still another purpose of the present disclosure is to suggest a thin flat panel type holography 3D display representing the high quality 3D images with the high processing speed by combining a left-eye holography display panel with a right-eye holography display panel.

In order to accomplish the above purpose, the present disclosure suggests thin flat type holography 3D display device comprises: a left-eye display panel for representing a left-eye 3D image; and a right-eye display panel disposed at one side of the left-eye display panel for representing a right-eye 3D image.

The device further comprises a controller providing a left-eye hologram data corresponding to the left-eye 3D image to the left-eye display panel and a right-eye hologram data corresponding to the right-eye 3D image to the right-eye display panel.

The left-eye display panel includes: a left-eye special light modulator for representing a hologram pattern corresponding to the left-eye 3D image; a left-eye back light unit disposed at the rear side of the left-eye special light modulator; a left-eye flat lens disposed in front of the left-eye special light modulator; and a left-eye eye-tracker disposed in front of the left-eye flat lens.

The right-eye display panel includes: a right-eye special light modulator for representing a hologram pattern corresponding to the right-eye 3D image; a right-eye back light unit disposed at the rear side of the right-eye special light modulator; a right-eye flat lens disposed in front of the right-eye special light modulator; and a right-eye eye-tracker disposed in front of the right-eye flat lens.

The left-eye display panel sets a focal point of the left-eye 3D image to a left-eye of an observer; and the right-eye display panel sets a focal point of the right-eye 3D image to a right-eye of the observer.

The holography 3D display device according to the present disclosure comprises a thin flat type back light unit, a spatial light modulator, a flat lens and a flat type eye-tracker. The present disclosure suggests a high quality holography 3D display device by representing the left-eye holography 3D image to the left-eye of the observer and the right-eye holography 3D image to the right-eye of the observer. Furthermore, by combining the left-eye holography display panel with the right-eye holography display panel, it is possible to suggest high quality and high speed processed holography 3D images/video without expensive high speed processing display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Figure 2:
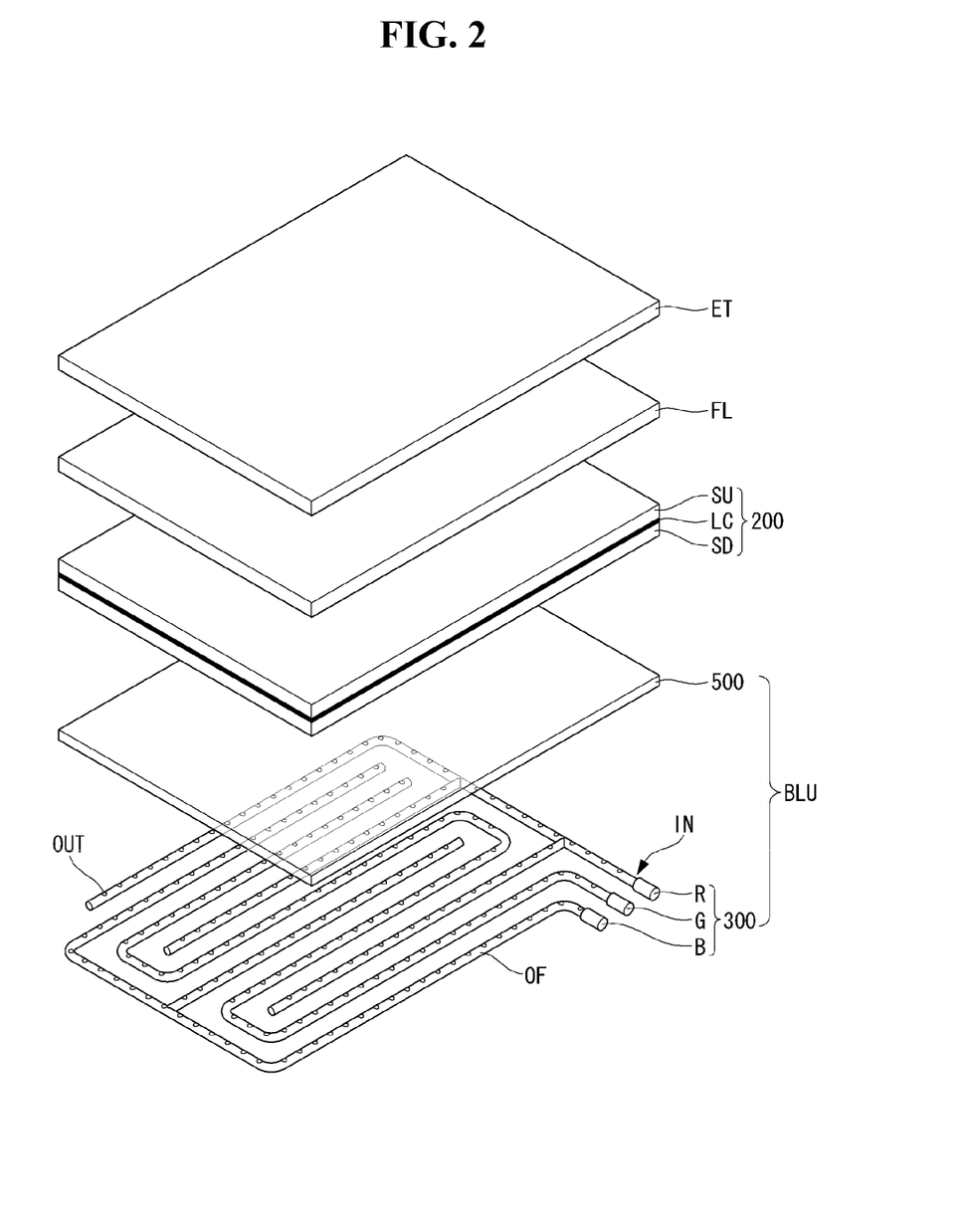
FIG. 2 is a structural drawing illustrating the digital holography image/video display device using a transmittive liquid crystal display device according to the first embodiment of the present disclosure.

Referring to FIG. 2, we will explain a thin flat type holography 3D display device using a transmittive liquid crystal display is used as the space light modulator according to the first embodiment of the present disclosure. FIG. 2 is a structural drawing illustrating the digital holography image/video display device using a transmittive liquid crystal display device according to the first embodiment of the present disclosure.

The holography 3D display device according to the first embodiment of the present disclosure comprises a SLM 200 made of the transmittive liquid crystal display panel. The SLM 200 comprises a upper substrate SU and a lower substrate SD which are made of transparent glass substrate and faced each other, and a liquid crystal layer LC sandwiched between the upper substrate SU and the lower substrate SD. The SLM 200 may represent the interference fringe patterns by receiving the data relating to the interference fringe patterns from a computer or video processor (not shown in figures). The upper substrate SU and the lower substrate SD may have the thin film transistors and the color filters for comprising the liquid crystal display panel, respectively.

At the rear side of the SLM 200, a back light unit BLU comprising a light source 300 and a optical fiber OF may be disposed. The light source 300 may be a set of laser diodes including a red laser diode R, a green laser diode G and a blue laser diode B, or a set of collimated LED including a red LED, a green LED and a blue LED. In addition, the light source 300 may include other color light source than red, green and blue color light sources. Otherwise, the light source 300 may have one source like a white laser diode or a white collimated LED. There may be many kinds of the light source 300. In these embodiments, the light source 300 is explained as comprising the red, green and blue laser diodes, in convenient.

In order to guide a reference light from the light source 300 to the SLM 200 and in order to distribute the reference light over the whole area of the rear surface of the SLM 200, it is preferable to use optical fibers OF. For example, red, green and blue laser diodes R, G and B are disposed at one side of the back light unit BLU. Using the optical fibers OF, the laser beam irradiated from the laser diodes R, G and B can be guided as it reaches to the rear surface of the SLM 200. The optical fiber OF may be disposed as covering the whole surface of the SLM 200, the liquid crystal display. Especially, by removing some portions of the clad wrapping the core of the optical fiber OF in order to form a plurality of light points OUT, the laser beam may be irradiated over the whole surface of the liquid crystal display panel, SLM 200. Furthermore, in order to radiate the reference light expanded and irradiated by the optical fiber OF over whole surface of the SLM 200 evenly and to be a collimated light, a plurality of optical sheets 500 may be disposed between the SLM 200 and the optical fiber OF.

In the first embodiment, the back light unit BLU is one exemplary schematic structure using the optical fiber OF. In the case that the color pixels comprising the SLM 200 are disposed as one kind color is arrayed along the column, one optical fiber OF corresponding to one kind of color may be disposed as matching to the same color column. For another example, the back light unit BLU may comprise a surface emitting LED disposed at each color pixel. As the main concept of the present disclosure is not on the back light unit BLU, the detailed explanations for the back light unit BLU will not be mentioned.

In front of the SLM 200, at a proper position in the space between the observer and the SLM 200, a flat lens FL may be further included for focusing the 3D images. The focal point of the flat lens FL may be set in various. For example, the focal point may be set on an optimized position between the SLM 100 and the observer. For another example, the focal point may be set on the eye of the observer directly. In this case, the left-eye image and the right-eye image are sent to the left eye and the right eye, respectively. As the main feature of the present disclosure is not on the flat lens FL, the detailed explanation for the flat lens will not be mentioned.

Furthermore, an eye-tracker ET may be included in front of the flat lens FL. When the observer's position is changed, the eye-tracker ET may detect the changed observer's position, calculates the optimized viewing angle for the moved observer, and then deflects the focal point of the 3D images according to the new optimized viewing angle of the observer. For example, the eye-tracker ET may be a deflector for moving the focal point of the 3D images in horizontal direction according to the observer's position. Even though not showing in figures, the eye-tracker ET may further comprise a position detector for detecting the observer's position. As the main feature of the present disclosure is not on the eye-tracker ET, the detailed explanation for the flat lens will not be mentioned.

Figure 3:
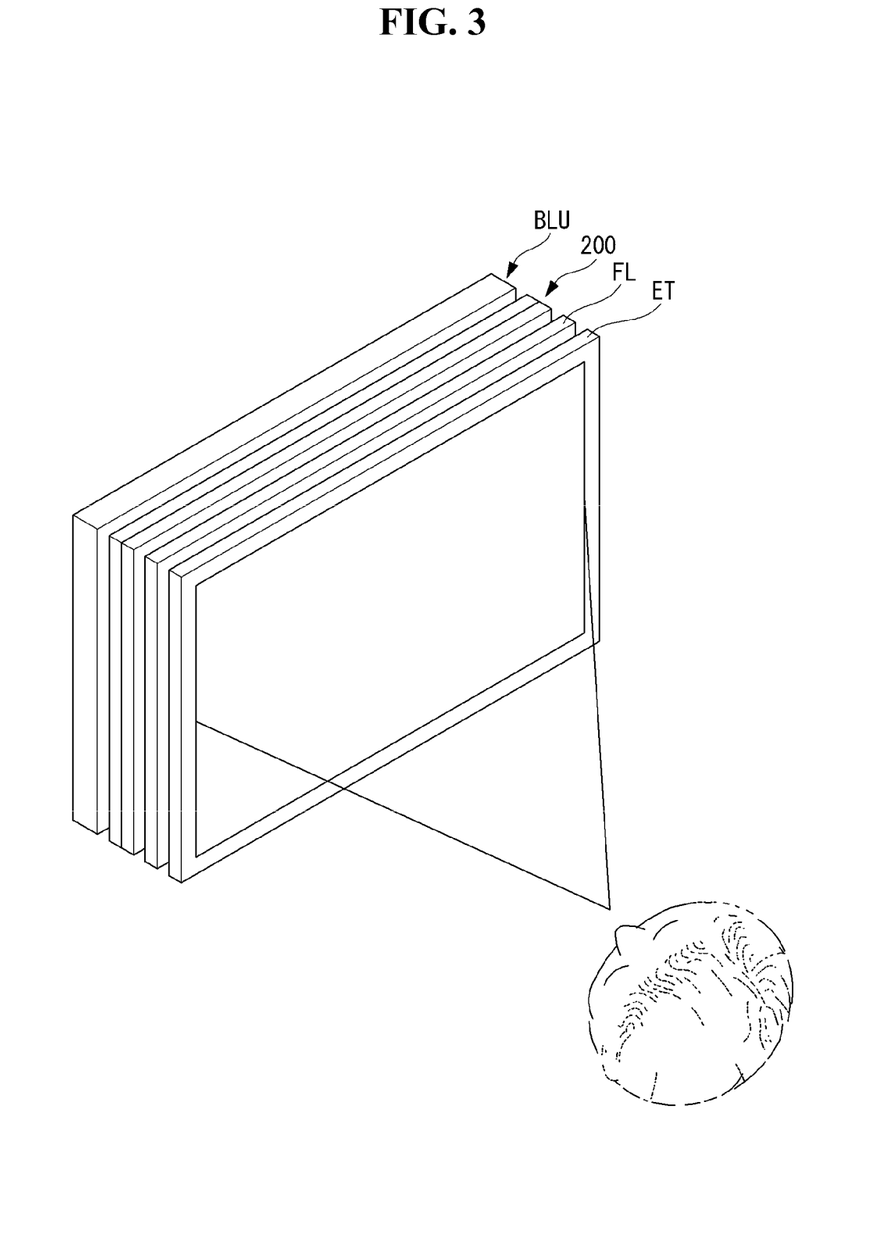
FIG. 3 is a schematic drawing illustrating that the digital holography 3D image/video display device represents a 3D image when the focal point of the 3D image is set between the SLM and the observer.

FIG. 3 is a schematic drawing illustrating that the digital holography 3D image/video display device represents a 3D image when the focal point of the 3D image is set between the SLM and the observer. Referring to FIG. 3, when the SLM 200 represents the interference fringe patterns for the holography type 3D images, as the reference light irradiated from the back light unit BLU is passing through the interference fringe patterns of the SLM 200, the holography 3D images would be shown at the focal point. The light from the SLM 200 is focused on the focal point between the SLM 200 and the observer by the flat lens FL. When the observer is moved to left or right side, the eye-tracker ET can detect this movement, and then it deflects the light from the SLM 200 to the moved position of the observer, so that the holography 3D images can be newly focused to the moved observer's position.

Figure 4:
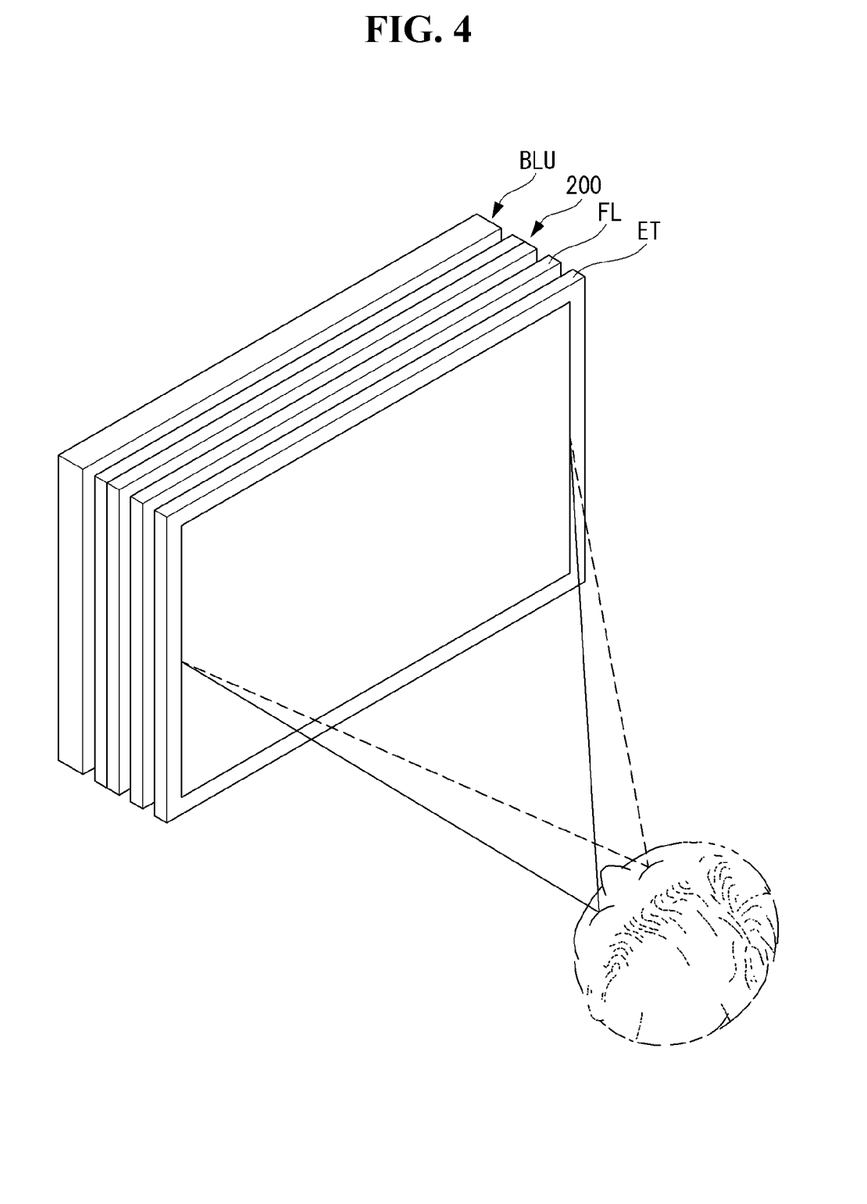
FIG. 4 is a schematic drawing illustrating a method for representing a 3D image/video by providing the left-eye image to the left eye and the right-eye image to the right eye, in the digital holography image/video display device according to the first embodiment of the present disclosure.

FIG. 4 is a schematic drawing illustrating a method for representing a 3D image/video by providing the left-eye image to the left eye and the right-eye image to the right eye, in the digital holography image/video display device according to the first embodiment of the present disclosure. The basic idea for representing the 3D images according to the FIG. 4 is very similar to that of the FIG. 3. The difference is that in the FIG. 4, the left-eye 3D images are sent to the left eye of the observer and the right-eye 3D images are sent to the right eye of the observer.

For example, at the first frame of the display, the left-eye holography 3D image/video may be represented. At this time, the focal point of the flat lens FL may be set at the middle point between the left-eye and the right-eye of the observer as an origin point. And, the eye-tracker ET may deflect the focal point to the left-eye. For example, as the average distance between the left-eye and the right-eye of human is about 65 mm, when the left-eye holography 3D image may be represented, the eye-tracker ET may set the deflection angle so as to move the focal point with 32 mm to the left-eye side from the origin point. At the second frame of the display, the right-eye holography 3D image/video may be represented. With the same method, the focal point of the flat lens FL may be set on the origin point. And, the eye-tracker ET may deflect the focal point to the right-eye side. That is, when the right-eye holography 3D image is represented, the eye-tracker ET may set the deflection angle so as to move the focal point with 32 mm to the right-eye side from the origin point.

With the monocular-scopic method as shown in FIG. 3, the non-glasses type 3D image may be represented. The holography 3D image/video according to the autostereoscopic method as shown in FIG. 4 may present more detailed and more clear 3D image quality. However, in the autostereoscopic method as shown in FIG. 4, the same frame image should be divided into the left-eye image and the right-eye image and then they are processed for making correct holography 3D image/video. Therefore, it requires very high speed processing and driving methods and devices. In order to smoothly process the high speed driving, many high technologies should be required. One example, the liquid crystal layer LC comprising the SLM 200 should be driven in high speed. This causes high cost because the liquid crystal material for high speed driving and its driving mode are very restricted.

Figure 5:
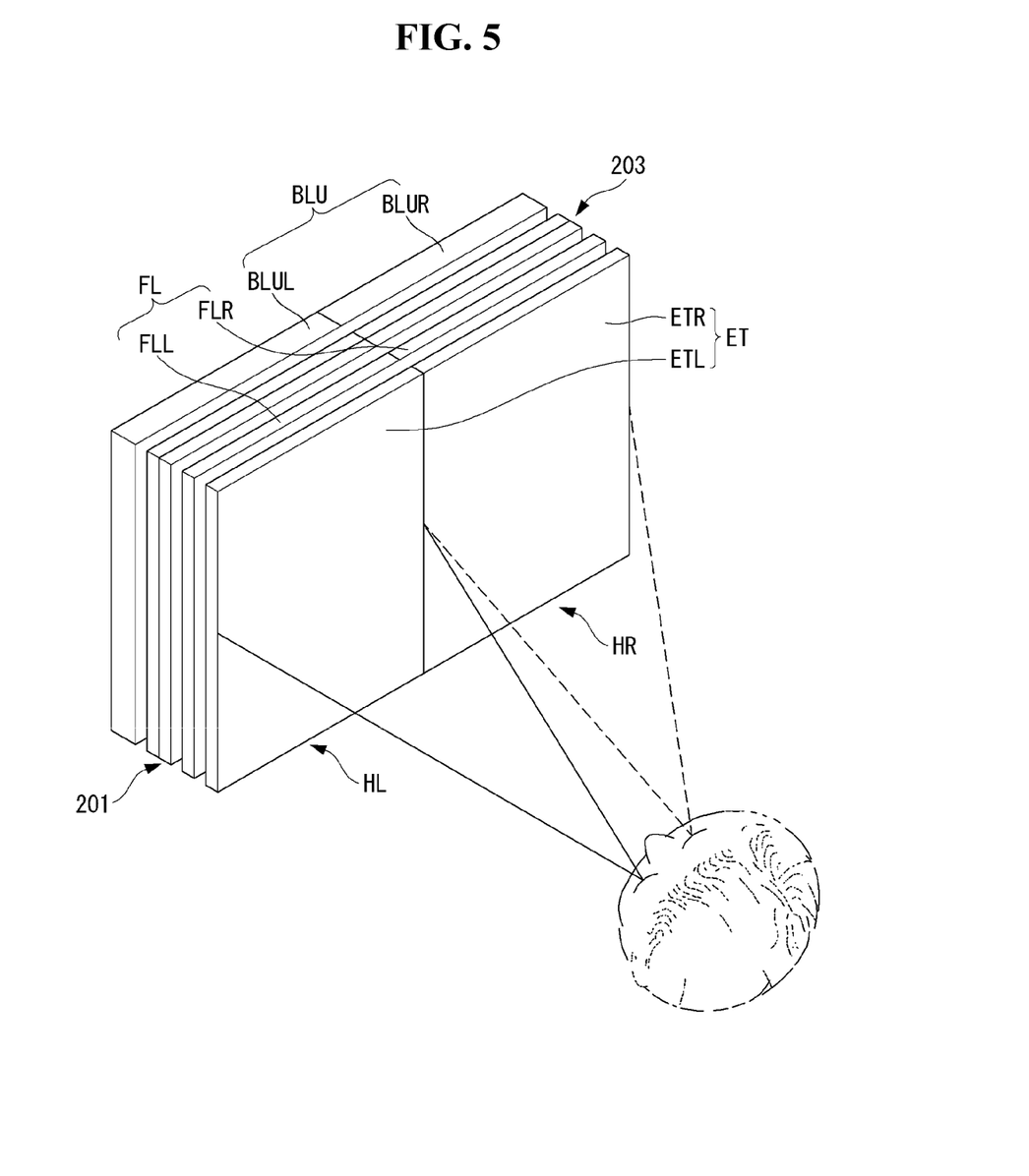
FIG. 5 is a schematic drawing illustrating the structure of digital holography 3D image/video display device by combining the left-eye display panel and the right-eye display panel according to the second embodiment of the present disclosure.

Therefore, in the second embodiment of the present disclosure, a holography 3D display system which not required high speed liquid crystal material and high speed mode driving method will be presented. FIG. 5 is a schematic drawing illustrating the structure of digital holography 3D image/video display device by combining the left-eye display panel and the right-eye display panel according to the second embodiment of the present disclosure.

Referring to FIG. 5, a holography 3D display according to the second embodiment of the present disclosure comprises two display panel used in the monocular-scopic holography 3D display as shown in FIG. 3. That is, it comprises a left-eye display panel HL and a right-eye display panel HR. Therefore, the autostereoscopic holography 3D display device according to the second embodiment comprises two monocular-scopic holography 3D display panels. These two holography 3D display panels are joined each other. For example, the left-eye display panel HL can be attached and/or disposed at left side of the right-eye display panel HR.

The left-eye display panel HL includes a left-eye SLM 201 and the right-eye display panel HR includes a right-eye SLM 203. The back light unit BLU includes a left-eye back light unit BLUL disposed at the rear side of the left-eye SLM 201 and a right-eye back light unit BLUR disposed at the rear side of the right-eye SLM 203. The flat lens FL also includes a left-eye flat lens FLL disposed in front of the left-eye SLM 201 and a right-eye flat lens FLR disposed in front of the left-eye SLM 203. Furthermore, the eye-tracker ET includes a left-eye eye-tracker ETL disposed in front of the left-eye flat lens FLL and a right-eye eye-tracker ETR disposed in front of the right-eye flat lens FLR.

The left-eye flat lens FLL of the left-eye display panel HL may set the focal point of the left-eye 3D image to the left-eye of the observer and the right-eye flat lens FLR of the right-eye display panel HR may set the focal point of the right-eye 3D image to the right-eye of the observer. Therefore, it is preferable that the focal point of the left-eye flat lens FLL is apart about 65 mm from the focal point of the right-eye flat lens FLR.

When the observer is moving to the left side or the right side, the eye-tracker ET can detect this movement of the observer, the left-eye eye tracker ETL may deflect the focal point of the left-eye flat lens FLL and the right-eye tracker ETR may deflect the focal point of the right-eye flat lens FLR, according to the viewing angle changed by the movement of the observer.

Figure 6:
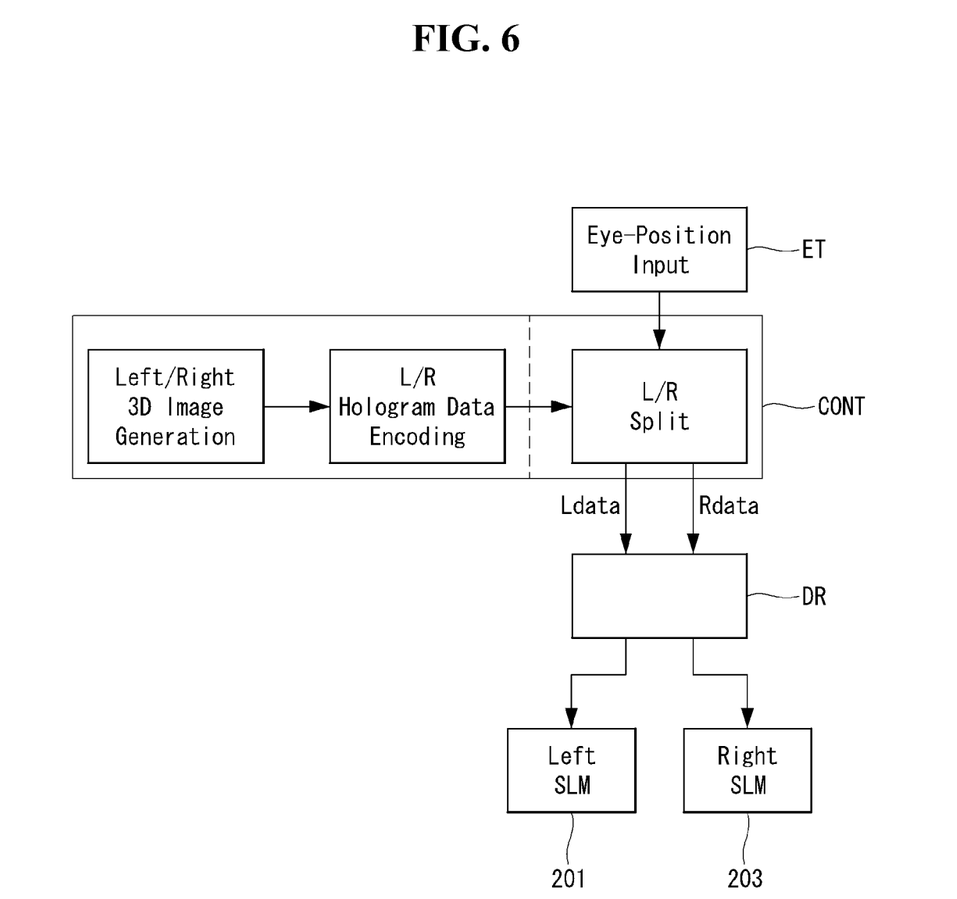
FIG. 6 is a block diagram illustrating an algorithm for driving the digital holography 3D image/video display device according to the second embodiment of the present disclosure.

Hereinafter, referring to FIG. 6, the driving algorithm of the autostereoscopic holography 3D display device according to the second embodiment of the present disclosure will be explained. FIG. 6 is a block diagram illustrating an algorithm for driving the digital holography 3D image/video display device according to the second embodiment of the present disclosure.

The controller CONT forming the 3D image/video may conduct the main three processes. First, the controller CONT makes the left-eye 3D image and the right-eye 3D image. Secondly, the controller CONT converts the left-eye 3D image into a left-eye hologram data and the right-eye 3D image into a right-eye hologram data, respectively. Thirdly, the controller CONT divides the left-eye hologram data and the right-eye hologram data each other and sends them to the driver DR for representing the 3D image on the display panel. Then, the driver DR, according to the synchronizing signals of the left and right 3D images, sends the left-eye hologram data to the left-eye SLM 201 and the right-eye hologram data to the right-eye SLM 203, respectively.

The autostereoscopic holography 3D display device according to the second embodiment of the present disclosure comprises a left-eye 3D display panel for representing only the left-eye 3D image/video and a right-eye 3D display panel for representing only the right-eye 3D image/video. Therefore, even though each 3D display panel does not satisfy the high speed driving conditions, it can represent the high quality 3D holography images/videos. For example, even though the left-eye and right eye 3D display panels comprise the transmittive liquid crystal display panel satisfying 60 Hz driving condition and of which liquid crystal material has the 8 ms reaction speed, it can suggest high quality and high speed holography 3D images/videos. As it is not required to process the holography 3D display data in high speed, the data processing load of the holography data can be reduced.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A dual holography 3D display device comprising:
    a left-eye display panel for representing a left-eye 3D image; and
    a right-eye display panel disposed at one side of the left-eye display panel for representing a right-eye 3D image,
    wherein the left-eye display panel and the right-eye display panel are monocular-scopic holography 3D display panels, respectively, single separate units and joined to each other.

2. The device according to the claim 1, further comprising:
    a controller providing a left-eye hologram data corresponding to the left-eye 3D image to the left-eye display panel and a right-eye hologram data corresponding to the right-eye 3D image to the right-eye display panel.

3. The device according to the claim 1, wherein the left-eye display panel includes:

a left-eye special light modulator for representing a hologram pattern corresponding to the left-eye 3D image;
    a left-eye back light unit disposed at the rear side of the left-eye special light modulator;
    a left-eye flat lens disposed in front of the left-eye special light modulator; and
    a left-eye eye-tracker disposed in front of the left-eye flat lens.

4. The device according to the claim 1, wherein the right-eye display panel includes:
    a right-eye special light modulator for representing a hologram pattern corresponding to the right-eye 3D image;
    a right-eye back light unit disposed at the rear side of the right-eye special light modulator;
    a right-eye flat lens disposed in front of the right-eye special light modulator; and
    a right-eye eye-tracker disposed in front of the right-eye flat lens.

5. The device according to the claim 1, wherein the left-eye display panel sets a focal point of the left-eye 3D image to a left-eye of an observer; and the right-eye display panel sets a focal point of the right-eye 3D image to a right-eye of the observer.

6. A dual holography 3D display device comprising:
    a spatial light modulator (SLM) including a upper substrate and a lower substrate and a liquid crystal layer sandwiched between the upper and lower substrates;
    a back light unit disposed on the lower substrate of the SLM;
    a flat lens disposed on the upper substrate of the SLM; and
    an eye-tracker layer disposed in front of the flat lens.

7. The device according to the claim 1, wherein the back light unit further comprises a plurality of optical fibers and a light source.

8. The device according to the claim 7, wherein the light source includes a set of laser diodes, and the optical fibers guide a laser beam from the laser diodes to a rear surface of the SLM.

9. The device according to the claim 8, wherein the optical fibers are disposed to entirely cover the rear surface of the SLM, and are formed with a plurality of light points so that the SLM is evenly and fully irradiated by the laser beam.

10. The device according to the claim 1, further comprising:
    a plurality of optical sheets disposed between the SLM and the optical fibers.

11. The device according to the claim 1, wherein the flat lens focuses a 3D image by setting a focal point that can be varied between the SLM and an observer.

12. The device according to the claim 11, wherein the eye-tracker layer detects a position of an observer when the observer moves, calculates an optimized viewing angle for that position of the observer, and deflects the focal point of the 3D image according to the optimized viewing angle.

13. The device according to the claim 12, wherein the eye-tracker layer is a deflector for moving the focal point of the 3D image in a horizontal direction according to the position of the observer.

* * * * *